(No Model.) 2 Sheets—Sheet 1.

J. C. CENTER.
SEED DRILL.

No. 284,378. Patented Sept. 4, 1883.

WITNESSES:
Chas. Nida
C. Sedgwick

INVENTOR:
J. C. Center
BY Munn & Co.
ATTORNEYS.

(No Model.) 2 Sheets—Sheet 2.
J. C. CENTER.
SEED DRILL.
No. 284,378. Patented Sept. 4, 1883.
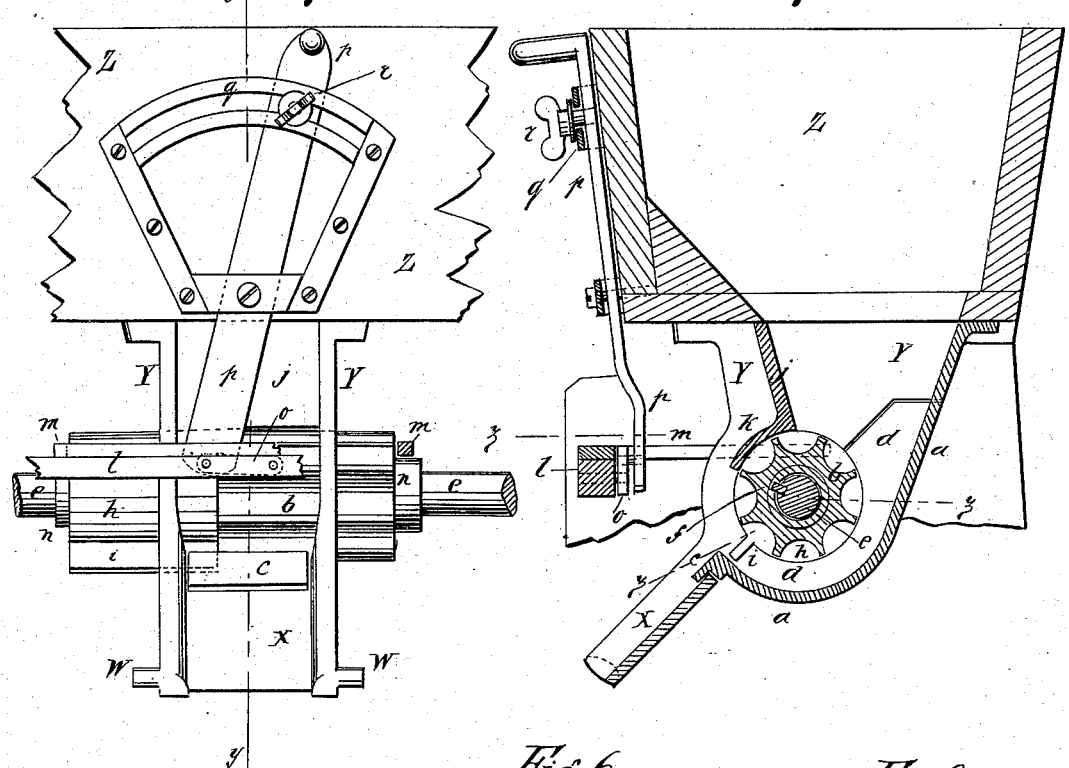
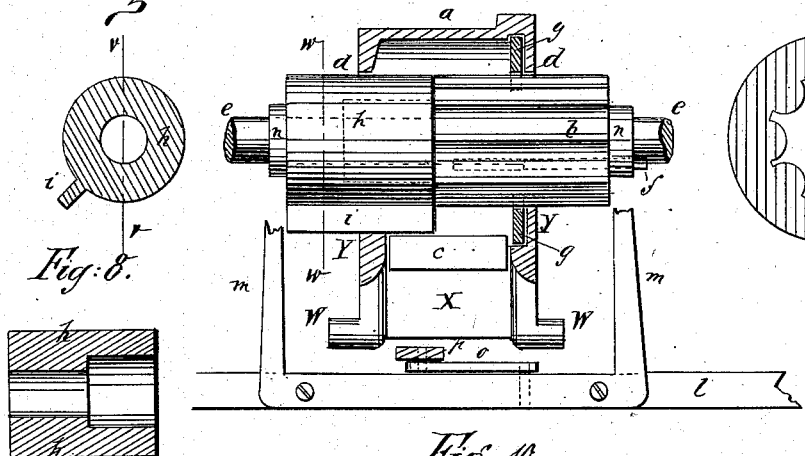
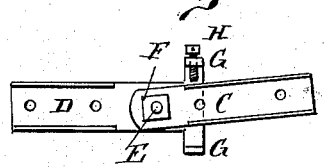
WITNESSES:
Chas. Nida
C. Sedgwick
INVENTOR:
J. C. Center
BY Munn & Co
ATTORNEYS.

UNITED STATES PATENT OFFICE.

JOSHUA C. CENTER, OF HAYNESVILLE, ASSIGNOR OF ONE-HALF TO LEWIS MAYO, OF LEAVENWORTH, KANSAS.

SEED-DRILL.

SPECIFICATION forming part of Letters Patent No. 284,378, dated September 4, 1883.

Application filed February 13, 1883. (No model.)

*To all whom it may concern:*

Be it known that I, JOSHUA C. CENTER, of Haynesville, in the county of Pratt and State of Kansas, have invented a new and useful Improvement in Seed-Drills, of which the following is a full, clear, and exact description.

Reference is to be had to the accompanying drawings, forming part of this specification, in which similar letters of reference indicate corresponding parts in all the figures.

Figure 1:
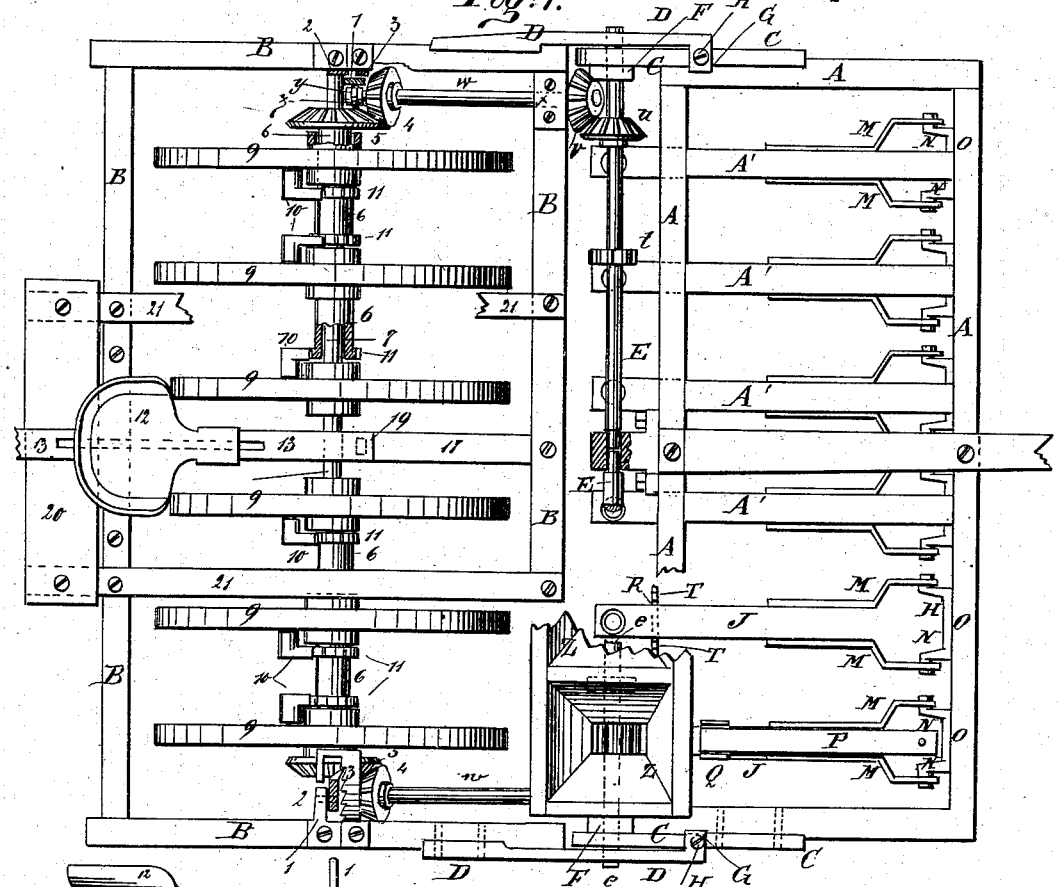
Figure 2:
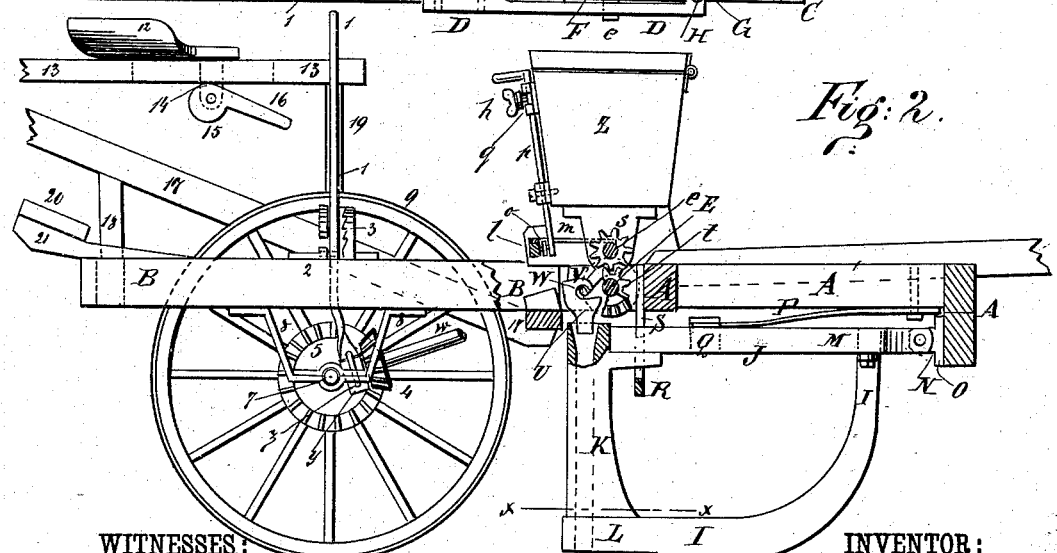
Figure 3:
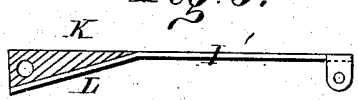

Figure 1, Sheet 1, is a plan view of my improvement, parts being broken away. Fig. 2, Sheet 1, is a side elevation of the same, partly in section. Fig. 3, Sheet 1, is a plan view of one of the runners, the standard being shown in section through the line $x\,x$, Fig. 2. Fig. 4, Sheet 2, is a rear elevation of a part of the same, showing the mechanism for regulating the amount of seed distributed. Fig. 5, Sheet 2, is a sectional side elevation of a part of the same, taken through the line $y\,y$, Fig. 4. Fig. 6, Sheet 2, is a sectional plan view of a part of the same, taken through the broken line $z\,z\,z$, Fig. 5. Fig. 7, Sheet 2, is a sectional end elevation of the sliding gage, taken through the line $w\,w$, Fig. 6. Fig. 8, Sheet 2, is a sectional side elevation of the sliding gage, taken through the line $v\,v$, Fig. 7. Fig. 9, Sheet 2, is a side elevation of the guard-plate for the seed-dropping cylinder. Fig. 10, Sheet 2, is a side elevation of the coupling-hinge.

The object of this invention is to facilitate the drilling of seed, and also to promote convenience in operating and adjusting seed-drills.

A represents the forward frame, and B the rear frame, of my improved seed-drill, which frames are connected by the hinges C D. The forward straps, C, of the hinges are bolted to the outer sides of the side bars of the forward frame, A, with their rear ends projecting in the rear of the ends of the said side bars. The rear straps, D, of the hinges are bolted to the outer sides of the side bars of the rear frame, B, with their forward ends projecting in front of the said side bars, so as to overlap the outer sides of the rear parts of the straps C. The straps C, at their rear ends, and the straps D, at a little distance from their forward ends, are perforated to receive the ends of the shaft E, which forms the pivots of the hinges. To the inner sides of the projecting rear ends of the straps C are attached, or upon them are formed, journal-boxes F, to form wider bearings for the shaft E.

Upon the upper and lower edges of the forward ends of the rear straps, D, are formed projecting lugs G, the ends of which are bent inward to overlap the inner straps, C, or the upper and lower sides of the side bars of the forward frame, A, and serve as stops to limit the play of the hinges C D, and consequently of the frames A B. The upper lugs, G, have screw-holes formed through them to receive set-screws H, to serve as adjustable stops to limit the descent of the rear part of the frame A, and consequently to limit the depth to which the runners connected with the said frame A, and hereinafter described, enter the soil.

The runners are formed of the curved bars or cutters I, that enter the soil and form the channels to receive the seed, the top bars, J, and the standards K. The upper ends of the cutters I are bolted to the top bars, J, near their forward ends. The standards K are secured at their lower ends to the rear ends of the cutters I, and at their upper ends to the rear ends of the top bars, J. The rear ends of the cutters I are inclined to one side to form mold-boards L, to move the soil to one side, and thus open channels to receive the seed. Half of the cutters I have their mold-boards L formed upon the right-hand side, and the other half have their mold-boards L formed upon the left-hand side, so that the side draft will be balanced and the machine will move forward in a straight line.

To the opposite sides of the forward ends of the top bars, J, are attached straps M, which project in front of the said ends, and are bent outward and then forward, and have perforations formed in their ends to receive pivots formed upon lugs N, formed upon the ends of plates O, attached to the lower part of the rear side of the front cross-bar of the frame A. The frame A is made with a longitudinal bar, A', directly above each runner I J K. To the under side of the forward part of each bar A' is attached the forward end of a spring, P, which is bent downward and rearward, and its rear end rests upon a rub-plate, Q, attached to the upper side of the rear part of the top bar, J, and which has upwardly-projecting flanges upon its ends to keep the said spring P in place.

The springs P are made of such a strength as to hold the runners I J K down to their work under ordinary circumstances, but which will yield and allow the said runners to rise should they encounter a stone, root, or other obstruction which they cannot cut, and will force the runners down to their places as soon as they have passed the obstruction.

The downward movement of the runners I J K is limited by a bar, R, placed beneath the rear parts of the top bars, J, or beneath arms formed upon the upper parts of the forward sides of the standards K, for the top bars, J, to rest upon and be secured to. The bar R has upwardly-projecting arms S formed upon or attached to its ends, which arms are attached to the rear parts of the side bars of the frame A. Upon the bar R are formed, or to it are attached, as many pairs of upwardly-projecting arms T as there are runners I J K, which arms pass up upon the opposite sides of the top bars, J, of the said runners and hold the runners from lateral movement.

The standards K are perforated longitudinally for the passage of the seed into the channels opened by the cutters I, and the upper ends of the said perforations are flared to adapt them to receive and work freely upon the conductor-tubes U. The upper parts of the tubes U are enlarged and have their rear parts cut away, and upon the shoulders thus formed are formed hooks V, to hook upon pivots, W, formed upon the sides of the lower ends of the chutes X, that receive the seed from the distributing mechanism and guide it into the tubes U. The sides Y of the chutes X are extended upward, and are provided at their upper edges with perforated lugs to receive the screws or bolts by which they are secured to the bottom of the seed-box Z.

$a$ is the cup that forms the bottom of the chamber that receives the seed-dropping cylinder $b$. Upon the upper edge of the cup $a$ are formed perforated lugs to receive the screws or bolts that secure the upper edge of the said cup to the bottom of the seed-box Z. The lower end of the cup $a$ has a lip, $c$, formed upon it to overlap and rest upon the upper side of the upper part of the bottom of the chute X, to support the said lower end of the cup $a$ in place. Upon the side edges of the cup $a$ are formed flanges $d$, the upper ends of which are formed upon an angle to fit into angular recesses in the rear parts of the sides Y of the chute X, to hold the said cup $a$ from moving.

In the adjacent edges of the flanges $d$ and sides Y are formed semicircular notches to form circular apertures to receive the seed-dropping cylinder $b$, which is perforated longitudinally to receive and slide upon the shaft $e$. The shaft $e$ revolves in bearings attached to the seed-box Z or to the frame A, and to it is attached a feather, $f$, to enter a groove in the inner surface of the cylinder $b$, so that the said shaft will carry the said cylinder with it in its revolution. In the face of the cylinder $b$ are formed rounded corrugations to take the seed from the feed-chamber and discharge it into the chute X.

In a recess in the inner side of one of the sides Y and flanges $d$ is placed an annular plate, $g$, the inner edge of which is scalloped to correspond with and fit into the corrugations of the cylinder $b$, to prevent any seed from escaping at the end of the cylinder $b$ as the said cylinder slides back and forth through the said plate, the said plate being carried around by and with the said cylinder in its revolution. The other ends of the corrugations of the cylinder $b$ are closed by the end of the cylinder $h$, which fits against the said end of the cylinder $b$, and is perforated longitudinally to receive the shaft $e$. The cylinder $h$ is held from turning upon the shaft $e$ by the feather $i$, formed upon the side of the said cylinder $h$, and which enters a groove in the flanges $d$ of the cup $a$. The inner end of the cylinder $h$ is countersunk, as shown in Fig. 8, to receive the feather $f$, when the cylinders $b\ h$ are pushed forward.

The parts of the sides Y of the chute X above the cylinders $b\ h$ are connected by a plate, $j$, which forms the forward side of the feed-chamber. Upon the lower edge of the plate $j$ is formed a plate, $k$, which is curved in the arc of the circumference of the cylinders $b\ h$. The lower edge of the plate $j$ serves as a cut-off to prevent the corrugations of the cylinder $b$ from carrying out any more seed than enough to fill them, and the curved plate $k$ serves as a guard to keep the seed in the corrugations of the said cylinder until the said seed has been carried to a proper position to be discharged into the chute X. With this construction, by adjusting the cylinders $b\ h$, so that a greater or less part of the length of the corrugations of the cylinder $b$ may be within the feed-chamber, more or less seed will be distributed, as may be desired, and by adjusting the said cylinder $b\ h$, so that no part of the said corrugations will be within the said feed-chamber, no seed will be discharged, and the planter can be turned around and taken from place to place without waste of seed.

In bearings attached to the forward part of the seed-box support, or to the frame A, slides a bar, $l$, to which are attached, or upon which are formed, as many pairs of arms $m$ as there are pairs of cylinders $b\ h$ in the planter. The arms $m$ of each pair are at such a distance apart as to receive the two cylinders $b\ h$ between them, the said arms resting upon collars $n$, formed upon the outer ends of the said cylinders or upon the shaft $e$, so that the cylinders $b\ h$ can be adjusted to regulate or prevent the discharge of seed by the longitudinal movement of the bar $l$. To the bar $l$ is pivoted the end of a short connecting-bar, $o$, the other end of which is pivoted to the lower end of a lever, p. The lever p is pivoted at its middle part to the lower part of the rear side of the seed-box Z. The upper part of the lever p moves in a keeper, q, attached to the seed-box Z, and is provided with a clamping-screw, r, which passes through a slot in the said keeper q, so that the said lever can be readily secured in place, holding the cylinders securely in any position into which they have been adjusted.

The shaft e revolves in bearings attached to the supports of the seed-box Z or to the frame A, and is made in two parts placed in line with each other. To each part of the shaft e is attached a gear-wheel, s, the teeth of which mesh into the teeth of a corresponding gear-wheel, t, attached to the shaft E, so that the cylinder carrying shaft e will be driven from the shaft E. The shaft E revolves in bearings attached to the frame A, and is made in two parts placed in line with each other. To each part of the shaft E, near its outer end, is attached a beveled-gear wheel, u, the teeth of which mesh into the teeth of the beveled-gear wheel v, attached to the forward end of the shaft w. The forward part of each shaft w revolves in bearings x, attached to the forward cross-bar of the frame B. The rear end of each shaft w revolves in bearings y, secured by a clip, z, or other suitable means to the lower end of the lever 1, which is fulcrumed to a support, 2, attached to the frame B. The upper part of the lever 1 moves along a toothed catch-bar, 3, attached to the frame B, so that the said lever will be held securely in any position into which it may be adjusted.

To the shaft w, near its rear end, is attached a beveled-gear wheel, 4, the teeth of which mesh into the teeth of the beveled-gear wheel 5, attached to the end of the sleeve 6. The sleeve 6 is made in two parts and is placed upon the shaft 7, the ends of which are secured in bearings in hangers 8, secured to the side bars of the frame B. Upon the parts of the sleeve 6 are placed as many wheels 9 as there are runners I J K and pairs of cylinders b h, the said wheels being arranged in such positions as to follow the runners I J K and press the soil down upon the seed. The wheels 9 run loose upon the parts of the sleeve 6, and to them or to their hubs are pivoted pawls 10, which engage with the ratchet-wheels 11, formed upon or attached to the parts of the said sleeve 6 so that each wheel 9 will act independently of the others upon the part of the sleeve 6 with which it is connected, and one or more of the said wheels may move slower than the others, or may stop, or be turned back without affecting the operation of the machine. With this construction the seed-dropping mechanism at each side of the machine will be run by its own drive-wheels, which prevents side draft and causes the runners upon both sides of the drill to work at the same depth.

12 is the driver's seat, which rests upon the horizontal bar 13, and is provided with a downwardly-projecting lug, 14. The lug 14 passes through a longitudinal slot in the bar 13, and to its lower end is pivoted an eccentric or cam, 15, which is provided with a lever-handle, 16, so that the seat 12 can be readily secured and released, and adjusted in any desired position to cause the driver's weight to properly balance the machine. The rear end of the horizontal bar 13 is attached to the upper end of the inclined bar 17, the lower end of which is attached to the forward cross-bar of the frame B. The inclined bar 17 is supported in position by a standard, 18, attached to it and to the rear cross-bar of the frame B. The forward end of the horizontal bar 13 is attached to the upper end of the standard 19, the lower end of which is attached to inclined bar 17, so that the seat will be firmly supported.

20 is the foot-board or platform, which is secured to bars 21, attached to the cross-bars of the frame B.

Having thus described my invention, what I claim as new, and desire to secure by Letters Patent, is—

1. In a seed-drill, the feed-shafts E e, each made in two parts, placed in line with each other, and independently connected with a driving mechanism, substantially as herein shown and described, whereby side draft will be prevented, and both sides of the drill will be made to work at the same depth in the soil, as set forth.

2. In a seed-drill, the hinges, made substantially as herein shown and described, with bearing-boxes F upon the inner straps, C, and angular lugs G upon the projecting ends of the outer straps, D, whereby a wide bearing is formed for the hinging shaft or pivot, and the movements of the hinges are limited, as set forth.

3. In a seed-drill, the combination, with the frames A B, of the hinges C D E, provided with the angular lugs G, substantially as herein shown and described, whereby the forward frame is allowed to play within fixed limits, as set forth.

4. In a seed-drill, the combination, with the angular lugs of the hinges C D E, of the set-screws H, substantially as herein shown and described, whereby the movements of the said hinges can be regulated, as set forth.

5. The cutters I, inclined at an obtuse angle to form the mold-board L, fitting a correspondingly-shaped side of the standards K, as shown and described.

6. In a seed-drill, the combination, with the runners I J K and the frame A, of the pairs of straps M, having their forward ends bent outward and provided with pivot-holes, and the plates O, provided with pairs of lugs N, substantially as herein shown and described, whereby the said runners will have a free vertical movement on pivots at the front, as set forth.

7. In a seed-drill, the combination, with the hinged runners I J K and the frame A, of the keepers Q and the springs P, having their free ends movable in said keepers, substantially as herein shown and described, whereby the said runners are held down to their work, as set forth.

8. In a seed-drill, the combination, with the sleeve 6 and the loose press-wheels 9, of the ratchet-wheels 11 and the pawls 10, substantially as herein shown and described, whereby the said wheels are made to act independently upon the said sleeve, as set forth.

JOSHUA C. CENTER.

Witnesses:
  J. J. Cox,
  Thomas Martin.